(12) United States Patent
Cava

(10) Patent No.: US 6,819,367 B1
(45) Date of Patent: Nov. 16, 2004

(54) SHADE-FREE LIGHT CONTROL SYSTEM AND METHOD

(76) Inventor: Frank James Cava, 123 Bittercreek Dr., Folsom, CA (US) 95630

( * ) Notice: Subject to any disclaimer, the term of this patent is extended or adjusted under 35 U.S.C. 154(b) by 0 days.

(21) Appl. No.: 10/278,052

(22) Filed: Oct. 21, 2002

Related U.S. Application Data

(60) Provisional application No. 60/348,321, filed on Oct. 19, 2001.

(51) Int. Cl.[7] ............................................. G02F 1/1335
(52) U.S. Cl. ......................... 349/16; 52/171.3; 318/480
(58) Field of Search ......................... 349/16; 52/171.3; 318/480

(56) References Cited

U.S. PATENT DOCUMENTS

| 4,768,865 | A | | 9/1988 | Greenberg et al. | |
| 4,832,468 | A | | 5/1989 | Ito et al. | |
| 4,968,127 | A | | 11/1990 | Russell et al. | |
| 5,197,242 | A | * | 3/1993 | Baughman et al. | 52/171.3 |
| 5,377,037 | A | | 12/1994 | Branz et al. | |
| 5,384,653 | A | | 1/1995 | Benson et al. | |
| 5,663,621 | A | * | 9/1997 | Popat | 318/480 |
| 5,923,028 | A | | 7/1999 | Turnbull et al. | |
| 6,130,772 | A | | 10/2000 | Cava | |
| 6,405,105 | B1 | * | 6/2002 | Hsu et al. | 700/299 |
| 6,559,903 | B2 | * | 5/2003 | Faris et al. | 349/16 |

* cited by examiner

Primary Examiner—Tarifur R. Chowdhury
Assistant Examiner—Michael H Caley
(74) Attorney, Agent, or Firm—Edward S. Wright

(57) ABSTRACT

Light control system and method in which a privacy glass window having first and second transparent substrates with a film of liquid crystal between the substrates is mounted in the wall or roof of a building. The level of ambient light outside the building is monitored and/or sunlight impinging directly on the building is detected, and the film is energized to make the window transparent during daylight hours when sunlight is not impinging directly upon it. Some embodiments include override switches which permit the window to be made transparent at night and/or during cooler months when sunlight is falling directly on it, and some include an override switch which permits the window to be darkened during daylight hours in warmer months.

20 Claims, 2 Drawing Sheets

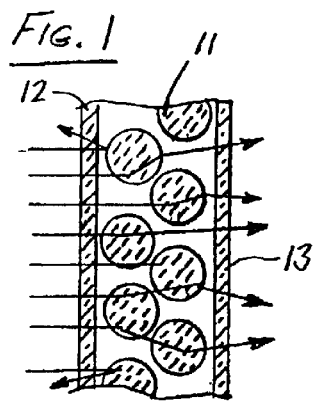
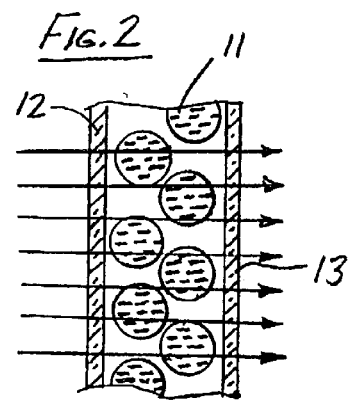
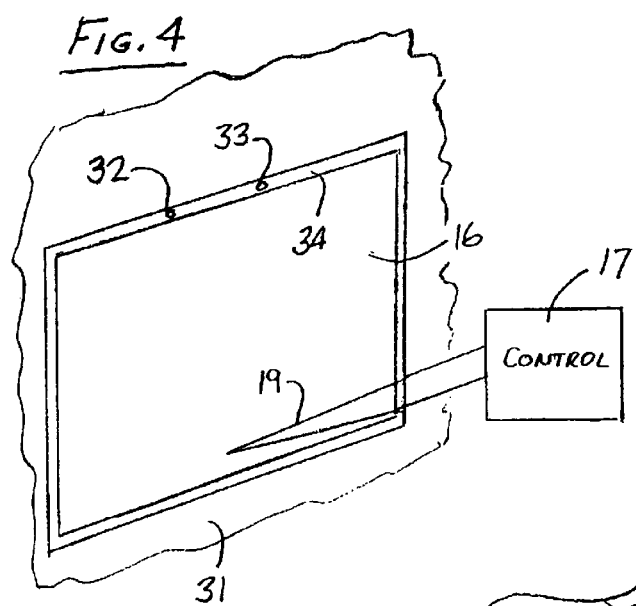
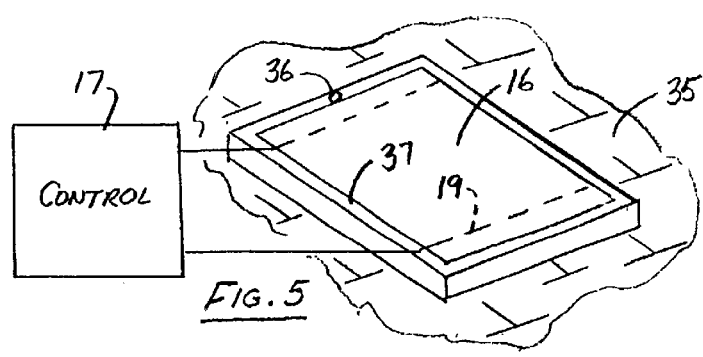

SHADE-FREE LIGHT CONTROL SYSTEM AND METHOD

CROSS-REFERENCE TO RELATED APPLICATION

This specification and claims are based upon Provisional Application No. 60/348,321, filed Oct. 19, 2001.

BACKGROUND OF THE INVENTION

1. Field of Invention

This invention pertains generally to window systems of the type in which transparency is controlled electrically and, more particularly, to system and method which utilizes a liquid crystal window technology known as "privacy glass" in exterior applications such as windows and skylights.

2. Related Art

Privacy glass is a double "E" window which, as illustrated in FIGS. 1 and 2, has a liquid crystal film 11 laminated between two sheets of glass 12, 13. In a non-energized state, the liquid crystal molecules disperse light, but when energized, the liquid crystal molecules are aligned in a manner which permits parallel light to pass through the film.

In its unenergized or natural state, the liquid crystal film is translucent. It has a milky white appearance and essentially prevents objects from being seen through it while still transmitting approximately 70 percent of the light in the visible spectrum. With the application of a small amount of electrical energy, the film becomes optically clear. With 70 percent transmissivity, privacy glass passes substantially more light in its darkened state than other electrochromic windows which pass only about 15–20 percent of the visible light.

For many years, privacy glass has been used in interior applications such as privacy screens for corporate conference rooms and hospital examination rooms, and in recent years, there have been some attempts to utilize privacy glass in the windows of dwellings and other buildings. However, those efforts have generally not been successful because the privacy glass has failed in a relatively short time in exterior applications.

One of the reasons for the rapid failure of windows utilizing privacy glass is the leakage of moisture into the laminated structure. Applicant has found that such leakage can be prevented by good construction techniques such as the use of a proper sealant, e.g. naturally cured silicone, around the edges of the laminated panels, thereby making it feasible to use privacy glass in exterior applications.

U.S. Pat. No. 6,130,772 and the references cited therein disclose additional techniques for controlling the transmissivity of electrochromic windows and other optical elements.

OBJECTS AND SUMMARY OF THE INVENTION

It is in general an object of the invention to provide a new and improved light control system and method.

Another object of the invention is to provide a system and method of the above character which can be utilized in exterior applications such as windows and skylights.

These and other objects are achieved in accordance with the invention by providing a light control system and method in which a privacy glass window having first and second transparent substrates with a film of liquid crystal between the substrates is mounted in the wall or roof of a building. The level of ambient light outside the building is monitored and/or sunlight impinging directly on the building is detected, and the film is energized to make the window transparent during daylight hours when sunlight is not impinging directly upon it. Some embodiments include override switches which permit the window to be made transparent at night and/or during cooler months when sunlight is falling directly on it, and some include an override switch which permits the window to be darkened during daylight hours in warmer months.

BRIEF DESCRIPTION OF THE DRAWINGS

FIGS. 1 and 2 are fragmentary cross-sectional views, somewhat schematic, illustrating the structure and operation of privacy glass.

FIG. 4 is a schematic diagram illustrating the light control system of FIG. 3 in conjunction with an exterior window in a building.

FIG. 5 is a schematic diagram illustrating the light control system of FIG. 3 in conjunction with a skylight.

DETAILED DESCRIPTION

Figure 3:
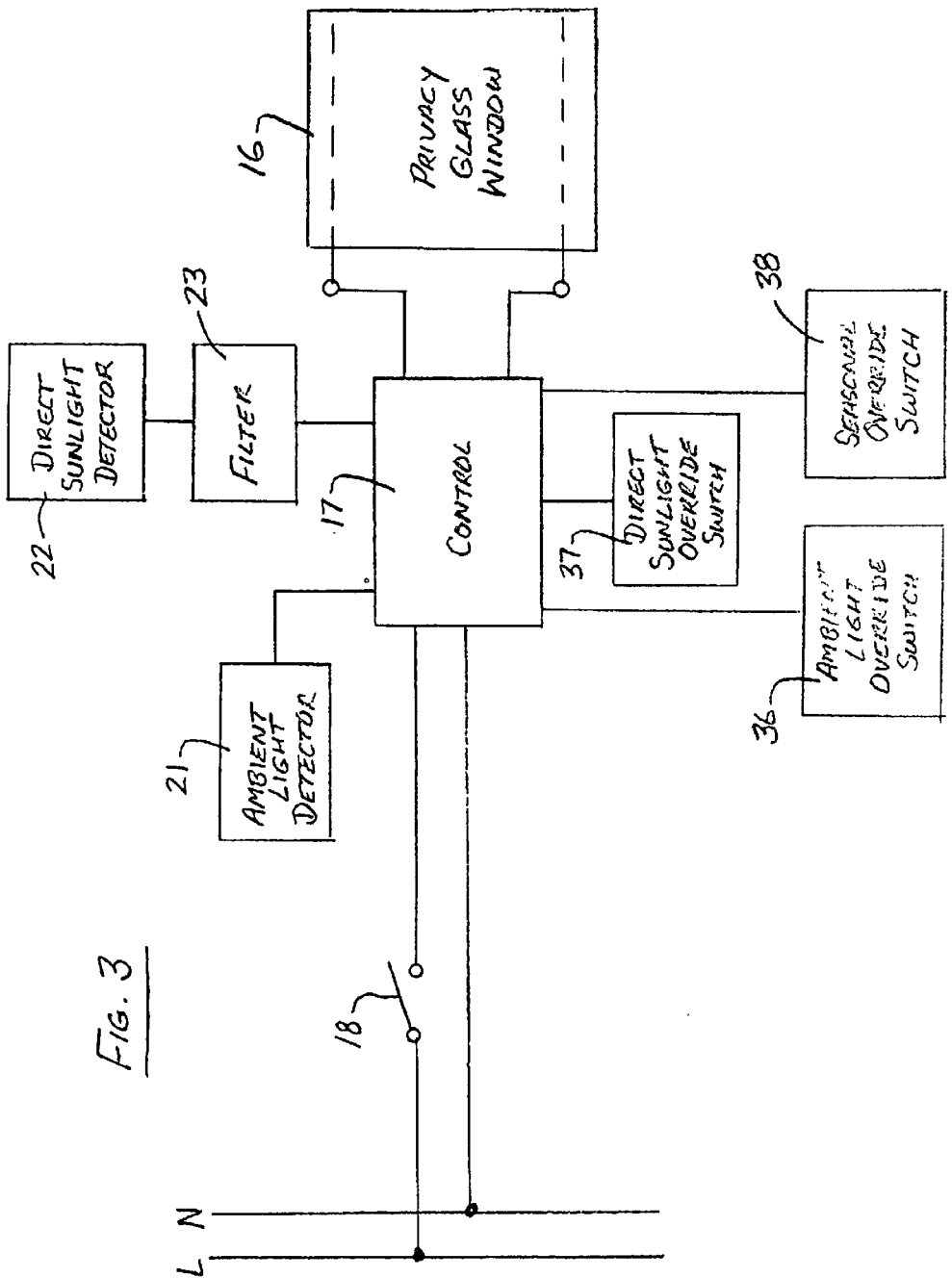
FIG. 3 is a block diagram of one embodiment of a light control system incorporating the invention.

In the embodiment of FIG. 3, the control system is illustrated in connection with a privacy glass window 16 which can, for example, be either an exterior window or a skylight in a building.

The system includes a control circuit 17 which receives operating power from conventional 120 volt, 60 Hertz power lines through an ON/OFF switch 18 and delivers an energizing voltage to buss bars or electrodes 19 connected to the liquid crystal film in the privacy glass. As discussed above, in its unenergized or natural state, the film is translucent, and when energized, it is transparent.

An ambient light detector 21 monitors the level of the light outside the building in which the window is installed and provides a signal to the control circuit which indicates whether the light is above or below a predetermined level. This level is typically chosen to distinguish between day and night. During daylight hours, when the light is above the threshold level, the control circuit energizes the LCD film, and the window is transparent. Between dusk and dawn, the light is below the threshold level, and the film is deenergized to provide privacy by preventing people from seeing through the window.

Means is also provided for darkening the window during daylight hours to prevent the sun's rays from passing directly through the window. This means includes a detector 22 which is actuated when exposed to direct sunlight. When actuated, this detector causes the control circuit to deenergize the LCD film, which then returns to its natural or translucent state and blocks the sunlight. This detector is generally most useful for windows having southern and/or western exposures, and it can be omitted from windows having other exposures, if desired.

The output of the direct sunlight detector is filtered to prevent flickering in the transparency of the window if the sunlight impinging upon it is temporarily interrupted by objects such as tree branches or other foliage, a problem which can be exacerbated by random movement of the branches or foliage due to wind. In FIG. 3, a filter 23 is illustrated as being connected the direct sunlight detector and the control circuit for that purpose. However, that filter could be included as part of either the control circuit or the detector, if desired. The filter includes an RC timing circuit with a time constant which determines the minimum duration of a change in impinging sunlight that will produce a change in the transparency of the window. That time constant is chosen to be long enough to avoid flickering.

Manually operable override switches 26, 27 are connected to the control system so that a person can control the state of the window at any time, night or day. Those switches can be mounted on a wall or in another convenient location within the building.

When activated or closed, switch 26 overrides the action of ambient light detector 21, and the window will be transparent as long as power switch 18 is on. When switch 26 is deactivated or open and the power is on, detector 21 will control the transparency of the window, making it clear when the sun is up and dark when the sun is down.

Switch 27, when activated or closed, overrides the action of direct sunlight detector 22, making the window transparent. When switch 27 is deactivated or open, detector 22 will control the transparency of the window, making it dark when the sun is shining directly on it and transparent at other times.

Alternatively, either the ambient light detector or the direct sunlight detector and the corresponding override switch can be omitted from the system if they are not needed.

A third override switch 28 permits the system to operate on a seasonal basis so that direct sunlight can be utilized for heating the building during the winter and other cool months and blocking the sun during the summer and other warm months. This switch overrides the operation of both the other override switches and the direct sunlight detector. When activated, it causes the liquid crystal film to be energized so that sunlight can pass through it during daylight hours. During evening hours, the ambient light detector still deenergizes the film to darken it and provide privacy. When the second override switch is deactivated, the system operates in the normal manner, keeping the window transparent during the day except when direct sunlight is impinging upon it, and darkening it at night to provide privacy, Operation and use of the system, and therein the method of the invention, are as follows. During daylight hours, when the light impinging upon ambient light detector 21 is above the threshold level, control circuit 17 applies an energizing voltage to the liquid crystal film, making the film transparent. In the event that direct sunlight impinges upon the window, the signal from direct sunlight detector 22 causes the control circuit to deenergize the film, thereby darkening it and preventing the direct sunlight from passing through the window. Filter 23 prevents intermittent changes in the impinging light from producing an annoying flickering in the transparency of the window.

Darkening the window when the sunlight is bright also serves to protect the liquid crystal film from thermal damage.

In the evening, when the ambient light drops below the threshold level of detector 21, the control circuit deenergizes the liquid crystal film, thereby switching it back to its natural translucent state. With the window thus darkened, the system provides privacy for occupants of the building from dusk until dawn when the ambient light once again rises to the level which causes the window to become transparent.

In darkening the window to provide privacy between dusk and dawn, the system functions much like a conventional window shade does. However, with this system, the need for shades is eliminated, and it can therefore be referred to as a "shade-free" window system.

In the evening, when the sun is down and the window is normally darkened for privacy, it can be made transparent by closing override switch 26. Likewise, when it is being darkened by direct sunlight during the day, it can be made transparent by closing override switch 27. It can be made dark at any time simply by opening ON/OFF switch to turn off the power.

In cooler months, override switch 28 can be turned on or activated to make the window transparent during daylight hours so that sunlight can pass through the window to warm the space within building. At night, ambient light sensor 21 causes the window to darken and prevent heat within the building from escaping through it. During warmer months, switch 28 is deactivated so that the ambient light detector and the direct sunlight detector can block direct sunlight and provide privacy as discussed above.

With its milky white color, the liquid crystal film tends to reflect impinging visible light rays, and as a result, absorbs less heat than materials of other colors which are sometimes used in electrochromic windows. This natural heat barrier further insulates the liquid crystal film from the damaging rays of the sun, particularly during direct exposure to sunlight. It also provides a natural thermal barrier that insulates the space served by the window.

Additional thermal insulation can be provided by applying heat blocking films to the glass panels. While passing most of the visible light spectrum, these films block infrared light that produces heat. These films are preferably applied to the number two surface of the dual pane system, i.e. the inner surface of the outer glass sheet or pane. Two presently preferred films include tin oxide with a fluorine dopant and a silver coating with a titanium layer beneath it. These films prevent heat from reaching the liquid crystal film between the glass panels and thereby protect the liquid crystal film from the stress and damage which could result from heat.

For environments having a direct sunlight and heat throughout the year, the silver-coated film with the titanium base is more effective. It is typically applied by sputtering onto the inner surfaces of the glass panels.

For more moderate climates, a tin oxide coating applied to the outer surfaces of the glass has been found to be more effective and durable, between dusk and dawn, the insulative properties of the heat blocking films also serve to protect the liquid crystal from being cooled too much by the cold night air.

The combination of the privacy glass and the heat blocking film has been found to be particularly effective in preventing the greenhouse effect from heating up a building excessively. Since the white color of the liquid crystal film absorbs the least amount of heat, the blockage of direct sunlight by that film gives the window a higher "R" rating than most other windows, and combined with the heat blocking film, it is quite effective as a thermal barrier. In cooler months, the privacy glass can be made transparent to pass the sun during the day and then darkened at night to retain heat within the building.

As noted above, the window 16 can be either an exterior window or a skylight, and FIG. 4 illustrates the window installed in the wall 31 of a building. In this embodiment, ambient light detector 21 and direct sunlight detector 22 comprise photocells 32, 33 which are mounted in the frame 34 above the window.

FIG. 5 shows the window 16 installed in the roof 35 of a building as a skylight. In this embodiment, the ambient light sensor is not utilized, and direct sunlight detector comprises a photocell 36 which is mounted in the frame 37 of the skylight. With just the direct sunlight sensor, the system prevents the sun's rays from passing directly into the building through the skylight to cause glare to the human eye and damage to furniture and other objects within the building. With a skylight, privacy is generally not an issue, and people seem to prefer that a skylight be clear between dusk and dawn so that the night sky and stars can be seen through it. However, if darkening of the skylight at night is desired, the ambient light detector and/or an override switch can be included.

The invention has a number of important features and advantages. If provides flexible and effective control over the light passing through windows in applications such as exterior windows and skylights, and it does so efficiently and economically without the need for window or other window coverings. Because of the low power requirements of the liquid crystal film, there is no need to use a supplemental power source such as solar cells to energize the film.

It is apparent from the foregoing that a new and improved light control system and method have been provided. While only certain presently preferred embodiments have been described in detail, as will be apparent to those familiar with the art, certain changes and modifications can be made without departing from the scope of the invention as defined by the following claims.

What is claimed is:

1. A system for controlling light entering a building, comprising: a window mounted in an exterior portion of the building having first and second transparent substrates and a film of liquid crystal having a normally translucent state between the substrates, an ambient light detector for monitoring the level of light outside the building, a direct sunlight detector for detecting sunlight impinging directly on the window, means responsive to the detectors for energizing the film to make it transparent when the light outside the building is above a predetermined level and deenergizing the film to make it translucent if sunlight is impinging directly on the window, and means for monitoring signals from the direct sunlight detector and inhibiting changes in the transparency of the film in response to changes in impinging sunlight of less than a predetermined duration.

2. The system of claim 1 wherein the window is mounted in an exterior wall of the building.

3. The system of claim 1 wherein the window is a skylight mounted in a roof portion of the building.

4. The system of claim 1 including manually operable means for overriding the ambient light detector such that the film is energized and transparent regardless of the level of light outside the building.

5. The system of claim 1 including manually operable means for overriding the direct sunlight detector such that the film is energized and transparent even if sunlight is impinging directly on the window.

6. The system of claim 1 including a seasonal switch for overriding the direct sunlight detector to energize the film during cooler months so that sunlight can pass through the window during daylight hours to warm space within the building, and deenergize the film during daylight hours in warmer months to prevent sunlight from entering the building.

7. The system of claim 1 including a heat blocking film on a surface of one of the transparent substrates.

8. A method of controlling light entering a building through a window mounted in an exterior portion of the building and having first and second transparent substrates with a film of liquid crystal having a normally translucent state between the substrates, comprising the steps of: monitoring the level of ambient light outside the building, detecting sunlight which impinges directly on the window, energizing the film to make it transparent when the light outside the building is above a predetermined level, deenergizing the film to make it translucent if sunlight is impinging directly on the window, and inhibiting changes in the transparency of the film in response to changes in impinging sunlight of less than a predetermined duration.

9. The method of claim 8 including the step of overriding the ambient light monitor such that the film is energized and transparent regardless of the level of light outside the building.

10. The method of claims 8 including the step of overriding the direct sunlight detector such that the film is energized and transparent even if sunlight is impinging directly on the window.

11. The method of claim 8 including the steps of energizing the film during cooler months even if sunlight is impinging directly on the window so that the sunlight can pass through the window during daylight hours to warm space within the building, and deenergizing the film during daylight hours in warmer months to prevent sunlight from entering the building.

12. The method of claim 11 including the steps of deenergizing the film to darken the window at night to provide privacy and prevent heat from escaping from the building through the window during cooler months.

13. The method of claim 8 including the stop of applying a heat blocking film on a surface of one of the transparent substrates.

14. A system for controlling light entering a building, comprising: a window mounted in an exterior wall of the building having first and second transparent substrates and a film of liquid crystal having a normally translucent state between the substrates, an ambient light detector for monitoring the level of light outside the building, means responsive to the detector for energizing the film to make it transparent when the light outside the building is above a predetermined level, a manually operable override switch for energizing the film to make it transparent even if the light outside the building is below the predetermined level, a direct sunlight detector for detecting sunlight impinging directly on the window, means for deenergizing the film to make it translucent if sunlight is impinging directly on the window, and means for monitoring signals from the direct sunlight detector and inhibiting changes in the transparency of the film in response to changes in impinging sunlight of less then a predetermined duration.

15. The system of claim 14 including a manually operable override switch for energizing the film to make it transparent even if the sunlight is impinging directly on the window.

16. The system of claim 14 including a heat blocking film on a surface of one of the substrates.

17. A system for controlling light entering a building, comprising: a skylight mounted in the roof of the building having first and second transparent substrates and a film of liquid crystal having a normally translucent state between the substrates, a direct sunlight detector for detecting sunlight impinging directly on the skylight, means for deenergizing the film to make it translucent if sunlight is impinging directly on the skylight, means for monitoring signals from the direct sunlight detector and inhibiting changes in the transparency of the film in response to changes in impinging sunlight of less than a predetermined duration, and a manually operable override switch for energizing the film to make it transparent even if the sunlight is impinging directly on the skylight.

18. The system of claim 17 including an ambient light detector for monitoring the level of light outside the building, and means responsive to the detector for energizing the film to make it transparent when the light outside the building is above a predetermined level.

19. The system of claim 18 including a manually operable override switch for energizing the film to make it transparent even if the light outside the building is below the predetermined level.

20. The system of claim 17 including a heat blocking film on a surface of one of the substrates.

* * * * *